United States Patent [19]  [11] Patent Number: 4,485,452
Cording et al.  [45] Date of Patent: Nov. 27, 1984

[54] SPEED MEASUREMENT SYSTEM

[75] Inventors: Richard W. Cording, Mishawaka; John C. Teager, Jr., South Bend, both of Ind.

[73] Assignee: The Bendix Corporation, Southfield, Mich.

[21] Appl. No.: 360,549

[22] Filed: Mar. 22, 1982

[51] Int. Cl.³ .................. G01P 3/48; G01R 23/02
[52] U.S. Cl. ................................. 364/565; 324/166; 377/19; 377/23; 377/26
[58] Field of Search ............... 324/160, 166; 364/565; 377/15, 16, 19, 20, 23, 24, 26

[56]  References Cited

U.S. PATENT DOCUMENTS

| | | | |
|---|---|---|---|
| 3,757,167 | 9/1973 | Yoshikawa et al. | 317/5 |
| 3,829,785 | 8/1975 | Schroder et al. | 328/130 |
| 3,917,927 | 11/1975 | Minton | 235/92 TF |
| 4,164,648 | 8/1979 | Chu | 377/20 |
| 4,267,575 | 5/1981 | Bounds | 377/19 |
| 4,281,388 | 7/1981 | Friend et al. | 364/565 |
| 4,355,364 | 11/1982 | Gudat | 364/565 |
| 4,368,426 | 1/1983 | Hayashi et al. | 364/565 |

FOREIGN PATENT DOCUMENTS 2949131 6/1981 Fed. Rep. of Germany .
2013896 2/1978 United Kingdom .
2054299 7/1979 United Kingdom .

Primary Examiner—Errol A. Krass
Assistant Examiner—Clifford L. Tager
Attorney, Agent, or Firm—Ken C. Decker

[57]  ABSTRACT

A speed measurement system including a magnetic pickup positioned in proximate relation to a driven element of a gas turbine engine having a plurality of discontinuities therein. The pickup providing a pulse per every discontinuity and thus a multiplicity of pulses for every revolution of the driven element. Conditioning circuitry connected to the pickup for generating a strobe pulse signal for every discontinuity. Interval measuring circuitry receiving interval signals asynchronous to the strobe pulses of a predetermined period which are to form a measurement period which is exactly related to a count of the strobe pulses over a measurement period. Additionally included is circuitry used to lengthen the measurement period up to a maximum of N intervals for increasing the low frequency response of the system.

9 Claims, 6 Drawing Figures

SPEED MEASUREMENT SYSTEM

The invention relates to a speed measurement system including means for producing a speed pulse signal whose frequency varies with an actual speed to be measured and signal conditioning means receiving the speed pulse signal and producing a square wave pulse signal of the same frequency as the speed pulse signal.

Electronic governing devices of the analog type have been available for decades. These devices typically take an a.c. speed signal from an engine driven tachometer-generator and rectify and filter the a.c. to arrive at a d.c. level representative of instantaneous engine speed. This actual speed signal is compared with a d.c. reference signal to find a speed error which is then used to correct any difference between the two. Such circuits are subject to the usual problems with any voltage sensitive analog control in that they are subject to error from temperature and aging effects of the components, from supply voltage variations, etc., so that for many applications their accuracy is not what might be desired.

Moreover, in governing devices for a gas turbine control system there are other engine operating variables used to determine fuel flow such as compressor discharge pressure, ambient temperature, and turbine temperature. Since in these control systems the various analog signals are effectively multiplied together, the errors tend to be cumulative. Currently it is desired to provide digital control systems which are much less sensitive to the above sources of error. It therefore becomes useful and basically necessary to provide a speed measurement system which will provide an accurate and reliable digital signal representing instantaneous engine speed on an almost real time basis.

Many methods of producing a digital rotational speed (rpm) signal depend on generating a pulse train with a frequency proportional to the rotational rate of an engine or other device whose speed is to be measured. Although the pulse rate could be at the same rate as the rotation of the measured shaft (i.e., one pulse per revolution), or at some multiple of the measured shaft speed, it is more common to generate a multiplicity of pulses corresponding to each revolution of the measured shaft by, for example, mounting an electromagnetic pickup coil adjacent a gear on the rotating body and electromagnetically sensing the passage of holes or slots (magnetic discontinuities) in the rotating disc or the like. Use of a multiplicity of pulses per revolution permits a more accurate digital representation of the instantaneous rotation rate. Since the pulses so generated are actually representative of the angular position, conversion to a rotation rate requires the introduction of the element of time. This is customarily done by a frequency measurement in which the number of pulses representative of the shaft rotation is counted over a fixed (or at least known) time interval or by a period measurement, in which the number of increments of some short time (i.e. a known high frequency pulse train) is counted between occurrences of two rotation-derived pulses or a known multiple of the rotation-derived pulses.

Such frequency measurement methods are inherently limited at low rotation speeds because as the number of rotation-derived pulses in the reference time interval becomes less, the digitized accuracy becomes poorer. The period measurement method is inherently limited at high rotation speeds as the number of time increments during the interval between rotation-derived pulses becomes less and, likewise the digitized accuracy becomes poorer. Period measurements usually suffer from the additional disadvantage that systems constraints render it difficult to count each period between successive shaft-related pulses unless special techniques are employed or high speed memory transfer with simultaneous counter reset is applied. Additional constraints are imposed in such control systems by the required control response time (usually short) and, in microprocessor-derived control systems, the requirement that a value for the measured variable (i.e., the engine speed) that is as current as practical be available to the microprocessor on demand. Another problem is that the cyclic operation of the control microprocessor is completely asynchronous with the shaft rotation and hence speed pulse frequency.

A speed measurement system has been proposed in which a multiplicity of strobe counts are registered in a counter to become a representation of the frequency of a pulse train which is generated proportional to the rotational rate of a measured element. In this counting method the strobe pulses are summed over a particular iteration interval determined by the microprocessor of an engine control system. With this method the calculation will be in error by the amount of time between a previous strobe pulse and the beginning of the iteration or timing signal and the time between the end of the iteration signal and the last strobe pulse. A Vernier counter which counts a high speed clock is used to determine the time between such events. The time for the prior interval is calculated by counting the high speed clock pulses that occur between the previous strobe pulse and the beginning of the iteration interval while the time for the subsequent interval is calculated by counting the high speed clock pulses that occur between the end of the iteration interval and the last strobe pulse. The prior time interval is added to the basic iteration interval while the subsequent interval is subtracted from the basic iteration interval. This produces a system which provides a measurement time interval which is equal to the exact number of pulses counted for the strobe count.

This system is more fully described in co-pending U.S. application Ser. No. 232,615 filed Feb. 9, 1981, in the names of Robert C. Thomas et al. which is commonly assigned with the present application. The disclosure of Thomas et al. is hereby expressly incorporated by reference herein.

However, because the technique disclosed in Thomas et al. is an improvement on the frequency measurement method, it is also inherently limited at low rotation speeds. For example, at least one strobe pulse must occur during a sampling or iteration period for the speed to be calculated by this technique. Thus, the low frequency measurement limit of this system is equal to the inverse of the iteration interval. The only way to measure lower frequency by this technique is to shift the entire frequency measurement range downward (lengthen the iteration interval). Along with reducing the upper frequency measurement limit, a downward shift also requires a compromise between the speed update rate for all frequencies and accuracy at the higher frequencies.

Therefore, it would be highly desirable to allow the sampling period to be expanded for lower frequencies without changing the sampling period for higher frequencies or the method of calculation. The result would be an expanded low speed measurement limit that does not reduce the accuracy of the calculation at higher speeds.

SUMMARY OF THE INVENTION

Therefore, it is the object of the invention to provide an accurate speed measurement system and measurement technique that has extended low speed measurement capabilities which do not affect its high speed measurement accuracy.

In accordance with this object, the invention provides a speed measurement system comprising means for generating a strobe pulse signal whose frequency is proportional to the speed of an element to be measured, a counter for counting the number of strobe pulses which occur during a total time interval; means for generating the total time interval as a period equal to n base iteration intervals plus a previous interval and minus a subsequent interval, wherein the previous interval is the time between the beginning of the n base intervals and the last previous strobe pulse, wherein the subsequent interval is the time between the end of the n base intervals and the last previous strobe pulse, and wherein n is the number of base intervals necessary to count at least one strobe pulse; and means for dividing the strobe pulse count by the total time interval to yield a count proportional to the speed of the measured element.

The advantage of this method is that the total time period whether at low or high frequencies of the speed measurement is always exactly related to a known number of strobe pulses and therefore highly accurate. At high frequencies the speed measurement is accomplished in one base iteration interval as one or several strobe pulses occur within that time period. As the rotational speed of the measured element decreases, more base intervals are added until at least one strobe pulse is counted. This is the minimum time (period between two strobe pulses) that is necessary to measure the rotational speed. The number of base intervals added to form the total interval may be limited to a maximum number N.

The high frequency response of the system is determined by the length of the base iteration interval and is preferably related to the highest useful speed to be measured for the rotating element. The low frequency response of the system is determined by the maximum number N of base iteration intervals used and is preferably related to the lowest useful speed to be measured for the rotating element. Moreover, the maximum number N of iteration intervals can be related to the lowest useful speed to be measured at a particular operating point of the measured element (engine) and can be variable with respect to the point chosen.

In this manner the high frequency response of the system remains highly accurate while extending the low frequency response to the point desired. Therefore, a highly flexible and accurate speed measurement system having an extended frequency response to lower frequencies than have been available heretofore is provided by the invention.

These and other objects, features, and advantages of the invention will be more fully described and better understood if a reading of the following detail of the description is undertaken in conjunction with the attached drawings wherein:

DETAILED DESCRIPTION OF THE PREFERRED EMBODIMENT

Figure 1:
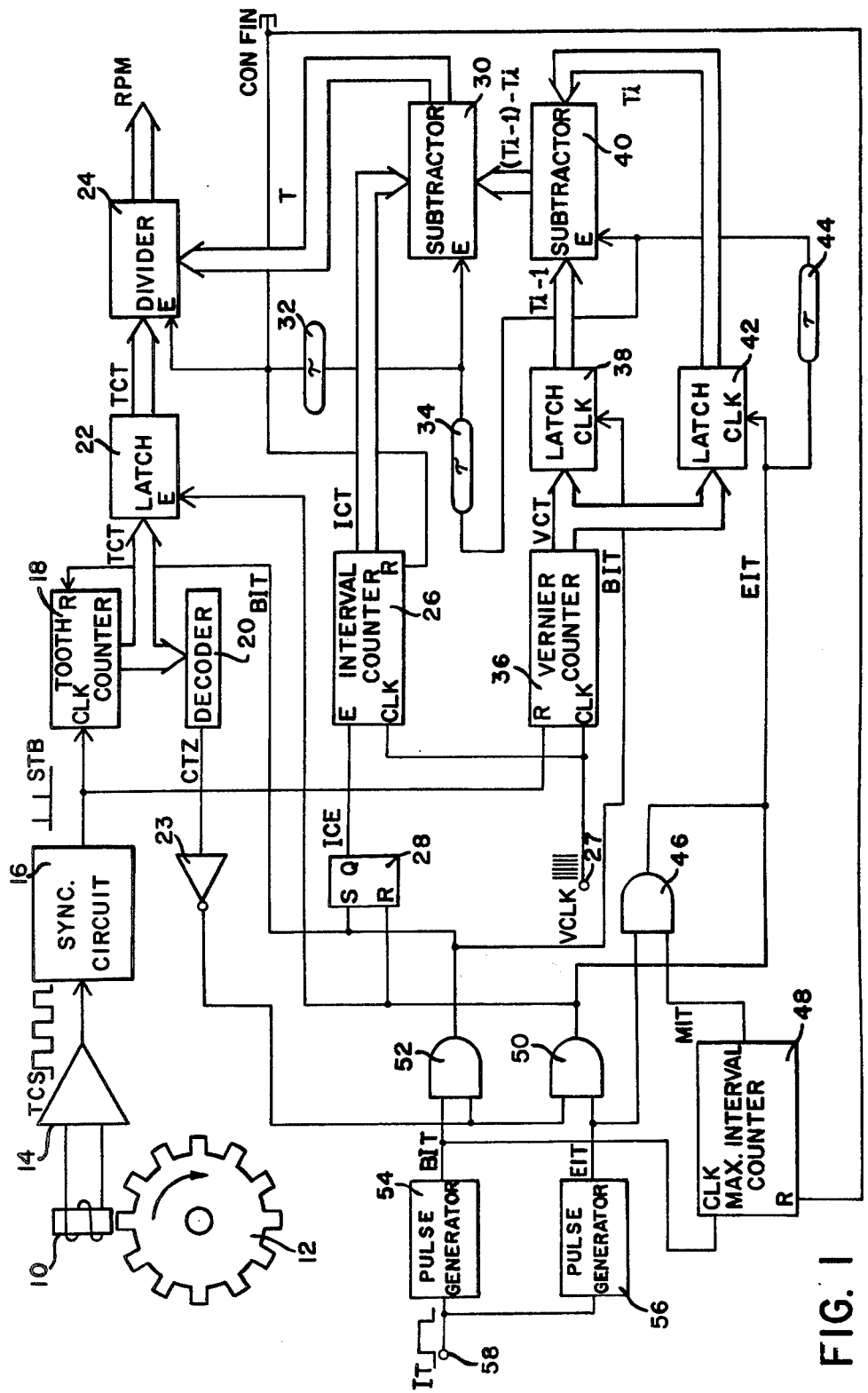
FIG. 1 is a detailed electrical schematic block diagram of a speed measurement system implemented according to the invention.

With reference now to FIG. 1 there is shown a first preferred embodiment of a speed measurement system constructed in accordance with the invention. The speed measurement system will be described in the context of measuring the speed of a gas turbine engine and under the control of a microprocessor of the engine control system. However, the invention should not be limited to the one application described which is only exemplary. The speed measurement system includes a magnetic pickup 10 positioned adjacent the teeth or slots of an engine-driven gear or timing member such that it produces a pulse each time a magnetic discontinuity of the member passes the pickup. The timing member 12 is driven synchronously with the rotational speed of the engine or element desired to be measured or some multiple or submultiple thereof.

The pulses from pickpup 10 are processed in a signal conditioning circuit 14 where they are converted to a signal consisting of a series of square waves, one per pulse. This square wave signal or tooth count signal is indicated by the reference TCS. The TCS signal is supplied to a synchronizing circuit 16 which produces a short strobe pulse signal STB having one pulse for every square wave of the TCS signal. Preferably, in the embodiment illustrated the strobe pulses are synchronous with the falling edge of each TCS signal. In this manner a strobe pulse is provided for each passage of a discontinuity by the pickup 10.

The measurement system receives these strobe pulses STB asynchronously to a command for a speed measurement IT from the engine control microprocessor applied to terminal 58. The system calculates the frequency of the pulse train accurately in response to this signal and sends a digital respresentation thereof back to the microprocessor (not shown) via signals RPM and CON FIN.

The strobe signal STB is supplied to the clock input CLK of a tooth counter 18. Every strobe pulse increments the counter 18 until it is reset. The output of the counter 18 which is indicative of the tooth count is a digital signal TCT which is input to a latch 22 upon its enablement. Further, the tooth count TCT is decoded by a decoder 20 which produces a count zero signal CTZ if the output of the tooth counter is zero. The output of the decoder or the count zero signal is inverted in an inverter 23 and thereafter input to one of the respective inputs of AND gate 52 or AND gate 50. The signal CTZ in its inverted state is thereby used as an enabling signal for AND gates 50, 52.

The measurement system also includes a vernier counter 36 which counts a high speed vernier clock signal VCLK received at its clock input CLK via terminal 27. The vernier counter 36 is reset by each strobe pulse STB via its reset input R and therefore counts the time period between tooth transitions in increments of the vernier clock. The output of the vernier counter 36, a digital signal VCT is transferred at differing times to either latch 38 or latch 42 depending upon the inputs to their respective clock terminals CLK.

The latch 38 is loaded with the vernier count VCT upon a positive transition of the output of AND gate 52 while latch 42 is loaded with the vernier count VCT upon the positive transition of the output of AND gate 50. In this manner the latch 38 will contain a vernier count (Ti−1) which is equivalent to the time between the last strobe pulse (which resets counter 36) and the rising edge of the output of AND gate 52. Similarly, the latch 42 will contain a vernier count (Ti) equivalent to the time between the last strobe pulse and the rising edge of the output of AND gate 50. The time period (Ti−1) will be referred to as the previous time interval and the time period (Ti) will be referred to as the subsequent time interval as will be more fully explained hereinafter.

The output of latch 42, the subsequent interval (Ti), is subtracted from the output of latch 38, the previous interval (Ti−1) in a subtractor 40 upon its enablement. The subtractor is enabled by the rising edge of the output of AND gate 50 after it has been delayed by a slight time delay 44. The delay is to allow the latch 42 to settle before its output is used as the minuend of the subtractor 40.

A third counter or interval counter 26 is provided to count the high speed vernier clock signal VCLK provided to its input CLK from terminal 27. The interval counter 26 measures the time, in increments of the vernier clock, during which it is enabled by an interval count enable signal ICE. The interval count enable signal ICE is the output of the Q-terminal of an R-S flip flop 28. The ICE signal is generated as a high logic level when the flip flop 28 is set by a low-to-high transition of the output of AND gate 52. The counter 26 counts until the flip flop 28 is reset by the rising edge of the output of AND gate 50 which clears the Q-output and disables the counter.

The output of the interval counter, an interval count signal ICT, is a digital number which is input to one terminal of a subtractor 30 to form the minuend of a second subtraction. The other input forming the subtrahend of the subtractor 30 is the output of the subtractor 40. The subtraction is accomplished upon an enabling signal which is the rising edge of the output of AND gate 50 received by the E input of the subtractor 30 after a delay 34. The delay 34 is to provide the output of subtractor 40 time to settle before using it for the second subtraction.

The output of subtractor 30, which will be termed the total time interval T of the measurement, is a digitial number which is input to a divider 24 as a divisor. The other input of the divider 24 is the tooth count signal TCT from the latch 22 forming the dividend. Upon the enablement of the divider 24 the TCT signal is divided by the total time interval T to provide an indication of the speed measurement as a digital signal RPM. The enablement of the divider 24 is provided by the rising edge of the output of AND gate 50, a time delay 32 after enabling the subtractor 30. As was the previous case, the time delay 32 is to allow subtractor 30 to settle before its output is used in the division performed by divider 24.

The enabling signal is also used as a conversion finish signal CON FIN that is initially used to reset the interval counter 26 and a max interval counter 48 by transmission to their reset terminals R. The conversion finish signal CON FIN is further provided to the engine control to indicate that the speed measurement signal RPM can now be read.

It is seen, therefore, that the vernier count in latch 42 was first subtracted from the vernier count in latch 38 and then the result subtracted from the interval count ICT in subtractor 30. Thereafter, this digital count representing a total time interval T is used to divide the tooth count signal TCT to provide the speed measurement signal RPM. These two subtractions and division take place sequentially in this order to provide the proper timing for the final result. The sequence is provided by generating an enabling signal which then is delayed by delays 44, 34, 32.

The total timing interval T over which the speed measurement takes place is determined by a base sampling or iteration interval signal It input to terminal 58 from the engine control. The rising edge of the interval signal IT indicates the beginning of a measurement time period and the falling edge of the signal indicates the termination of that request. A pulse generator 54 produces a beginning interval signal BIT as a pulse on the rising edge of the IT signal and a pulse generator 56 produces an end of interval signal EIT as a pulse on the falling edge of the IT signal to provide indications of these events.

The signal pulse BIT is the output signal from AND gate 52 when the decoder 20 indicates that the count from the tooth counter 18 is non-zero thereby enabling the gate. Similarly, the EIT signal is the output of AND gate 50 when the decoder 20 indicates that the output count from the tooth counter 18 is non-zero. Generally, the BIT signal is used to initiate the measurement by resetting the tooth counter 18, setting flip-flop 28, and enabling latch 38. The EIT signal is used as the sequential signal that enables latch 42, subtractors 40, 30, divider 24 and finally resets flip-flop 28 and counter 26.

The pulse signal BIT is also used to clock a maximum interval counter 48 which is incremented at the beginning of every iteration interval. The max interval counter 48, if it reaches an overflow condition before it is reset by the conversion finish signal CON FIN, provides an overflow signal MIT. The signal MIT is used to enable an AND gate 46 which receives as its second input the end of interval signal EIT. The EIT signal is gated through the AND gate 46 if it is activated by the MIT signal to produce the same enabling signal as would occur if the signal were gated through AND gate 50. This signal will thus produce the two subtractions and division and further generate the conversion finish signal CON FIN as previously described.

The measurement technique of the system will now be more fully described with reference to the FIGS.

2a–i. The first set of waveform diagrams 2a–c indicates a normal measurement where there are a multiplicity of strobe pulses from signal STB during a single measurement interval IT. The frequency of the STB pulses are well within the frequency range of the iteration interval IT. If a vernier count (Ti−1) taken between the last strobe pulse 60 prior to the beginning of the timing interval IT and its initiation and a vernier count (Ti) is taken between the last strobe pulse prior to and the end of the timing interval IT and its termination, then the total time interval T over which an exact tooth count can be measured is available. The total time interval T is the interval IT with the addition of the previous interval (Ti−1) and the subtraction of the subsequent interval (Ti). The number of teeth counted for this interval is the number contained within the measurement interval IT or seven in the example shown. Since an exact number of teeth have been counted for a time interval, an accurate measurement of frequency can be accomplished by a division. This is the method previously described with respect to the referenced Thomas et al. application.

Figure 2:
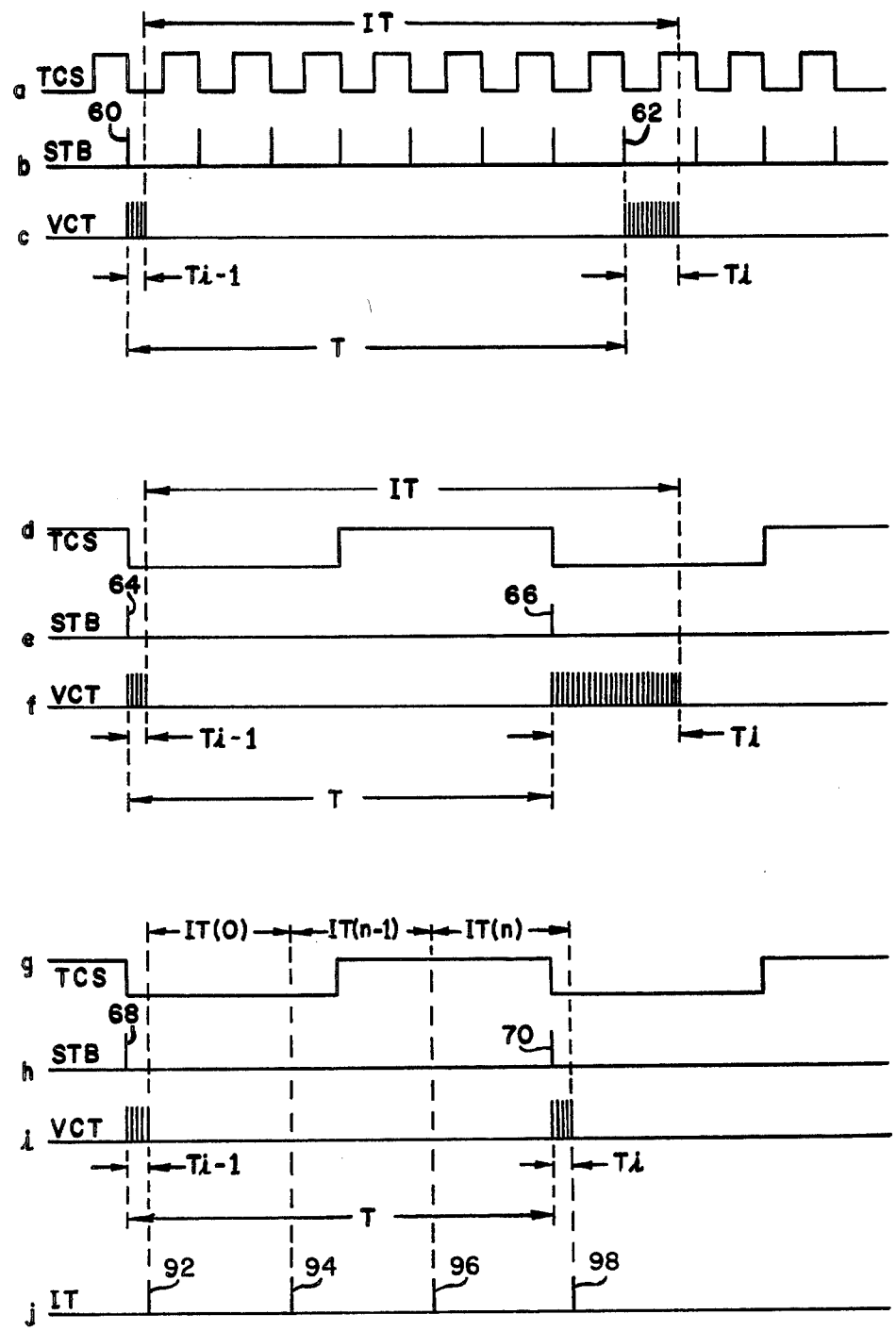
FIG. 2 is a series of waveform diagrams (a-j) of various signals for the embodiments of the system when either a single strobe pulse, less than a single strobe pulse, or a multiplicity of strobe pulses occur for a single iteration interval.

FIGS. 2d–f illustrate the speed measurement technique when only one pulse of signal STB occurs during an iteration interval IT. It is evident that with the technique of Thomas et al. at least one STB pulse must occur during the iteration interval IT to measure the speed. Without any STB pulse during the interval the tooth count will be zero and will consequently make the RPM signal zero. This action limits the low speed frequency response of the system to 1/t where t is the period of the iteration interval. As was the case in the previous example, the total time period T that one is interested in is the exact time between the two pulses 64, 66 of the strobe signal STB of FIG. 2e. It is measured by adding the previous time period (Ti−1) to the iteration interval IT and then subtracting the subsequent interval Ti.

The technique of the invention used for solving the low frequency response problem will now be described more fully if reference will be directed to FIGS. 2g–i. FIG. 2g illustrates the waveform TCS where the tooth count pulses occur at a lower frequency than the period of the iteration interval IT. The strobe pulses STB in FIG. 2h are separated by more than one iteration interval and therefore, cannot be measured in a single time period. The system initially develops a vernier count for the previous interval (Ti−1) which is the time between a first strobe pulse 68 and the beginning of an initial iteration interval IT(0). The technique used by the system then begins to accumulate iteration intervals IT(1), IT(2), . . . IT(n) until a second strobe pulse 70 occurs in the last of the intervals. When the second strobe pulse occurs a subsequent interval (Ti) extending from that strobe pulse to the end of the nth iteration interval IT(n) is measured. The exact total time between the two strobe pulses, T, is therefore the number of iteration intervals n(IT) plus the previous interval (Ti−1) minus the subsequent interval (Ti).

In this manner an arbitrarily low frequency can be measured by extending the measurement interval by multiples of a predetermined base iteration interval IT until a second pulse occurs. If need be, the number of iteration intervals n can be limited to any arbitrary number N such that when the measurement period equals or exceeds this time the speed measurement will be taken as zero. Further, it is well within the skill of the art to vary the maximum number N in dependence on operating conditions of the element whose speed is being measured.

For example if the rotational speed of a gas turbine engine is the parameter to be measured, N can be programmed depending upon an operational point of the engine. This would allow the measurement of a different minimum speed based upon conditions such as altitude, temperature, thrust, start-up or shut-down sequencing, takeoff, climb, cruise, etc.

Figure 3:
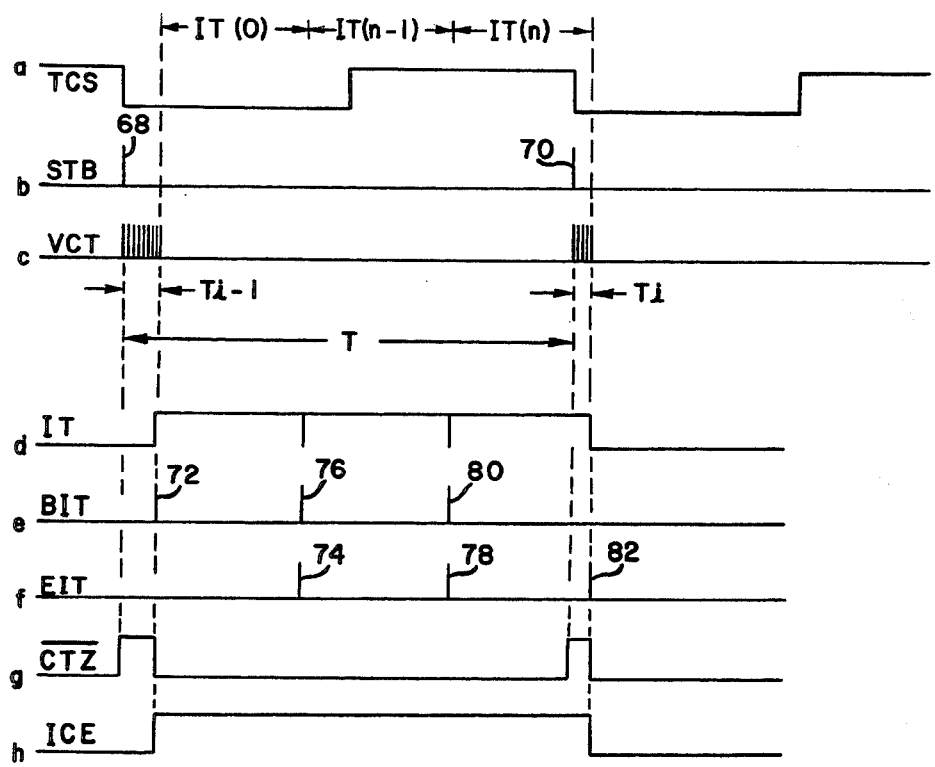
FIG. 3 is a series of waveform diagrams (a-h) illustrative of various signals of the system illustrated in FIG. 1 during a speed measurement where multiple iteration intervals are used.

FIGS. 3a–h will now be used in combination with FIG. 1 to describe the operation of the system to perform the measurement technique just described. It is noted that FIGS. 3a–c are identical to waveform FIGS. 2g–i just described and the additional FIGS. 3d–h are waveforms of various signals of the circuit of FIG. 1 which are shown synchronous thereto and on the same time base.

Returning now to FIG. 1, until the speed measurement is to be accomplished, the tooth counter 18 continues to count strobe pulses STB from the synch circuit 16 until it overflows to zero at which time the process continues. Further, during periods where there is no request for measurement, the vernier counter 36 counts the vernier clock pulses from signal VCLK until it is reset by each strobe pulse. The counter 36 thus stores the count of the vernier clock pulses between each strobe pulse and the next strobe pulse.

Now assume for the moment that the tooth counter 18 is zero and the strobe pulse 68 illustrated in waveform 3b occurs. This strobe pulse initializes the counter to a nonzero count which causes the count zero signal CTZ to make a transition to zero thereby enabling AND gate 52 through its inversion by inverter 23. The inversion of the CTZ signal is illustrated as waveform 3g. The vernier counter 36 at this time is counting the number of high speed clock pulses that have occurred since the strobe pulse 68. Sometime, after the occurrence of the first strobe pulse 68, the engine control will initiate an asynchronous request for speed measurement by causing a transition of the signal IT to a logical 1 as illustrated in FIG. 3d. The leading edge of the signal IT causes the pulse generator 54 to generate the pulse forming a beginning interval signal BIT.

Since the AND gte 52 is enabled by the inversion of the CTZ signal, the BIT pulse 72 is gated through it to the flip flop 28, thereby setting its Q output to a logical 1 and enabling the interval counter 26. This is shown in waveform 3h by the zero to logical 1 transition of the interval enable signal ICE. The interval counter now counts the high speed clock VCLK until the flip flop 28 is reset. The BIT pulse 72 additionally is used to clock the latch 38 to memorize the particular vernier count VCT in counter 36 coincident with the beginning of the iteration interval signal IT. The vernier count in counter 36 at this time is then equivalent to the previous interval (Ti−1). Additionally, the BIT pulse 72 is received by the counter 18 at its reset input R to clear the tooth counter 18. Upon this action, the inversion of the count zero signal CTZ will make a transition from a logical 1 level to a logical zero. The logical zero of waveform 3g will disable the AND gate 52 and not allow further BIT pulses to pass until the counter 18 again has nonzero contents.

At the end of the first timing interval IT(0) the engine control will cause a negative going transition of the IT signal period which will be turned into an end of interval pulse EIT shown in waveform 3f at 74. However, the EIT pulse is blocked by the disablement of AND gate 50 because the inversion of the CTZ signal is a logical 0 (the contents of counter 18 are zero). Therefore, the enabling signal to the subtractor and divider is disabled and the CON FIN signal will not be generated. The engine control, after it brings the initial interval signal IT(0) low, waits a short period of time for a conversion finish signal CON FIN from the speed measurement system. If the CON FIN signal is not received by the control within this set time the engine control recognizes that another iteration interval is necessary for the measurement of the speed because no strobe pulses have been counted in the tooth counter 18 during the initial interval.

Therefore, the engine control once again brings the IT signal to a logical 1 level causing another BIT pulse 76 to be generated. The BIT pulse 76 is blocked by the disabled AND gate 52 but it does add another count to the maximum interval counter 48. This sequence of events continues until either a second strobe pulse 70 is received by the tooth counter 18 or the maximum number of intervals N are counted. If a second strobe pulse 70 (in FIG. 3a) occurs before the maximum interval counter produces the overflow signal MIT, then the inversion of the count zero signal CTZ goes high at the incidence of that strobe pulse (in FIG. 3g). The inversion of the CTZ signal enables the AND gate 50 to gate for the next end of interval pulse EIT 82 therethrough. In this manner the EIT pulse 82 is applied to latch 42 thereby loading into the latch the Vernier count VCT that Vernier counter 36 has stored since the occurrence of the second strobe pulse. The vernier count VCT at this time is equivalent to the subsequent interval Ti. Additionally, the EIT pulse 82 loads into latch 22 the number of the tooth counts (one) stored in the tooth counter 18 since it was reset by the BIT pulse 72. Simultaneously, the interval counter 26 is disabled by resetting flip flop 28 with the EIT pulse 82 to change the ICE signal to a logical zero.

The EIT pulse thereafter enables subtractor 40 after being delayed by time delay 44 to subtract the count equivalent to (Ti) from the count equivalent to (Ti−1). Subsequent to the delay 34 the EIT pulse also enables subtractor 30 to subtract from the interval count ICT the difference between the intervals (Ti−1) and (Ti). The result of this subtraction is the total interval period T which is n(IT) plus the previous interval (Ti−1) and minus the subsequent interval Ti. After being delayed by time delay 32, the EIT pulse enables the divider 24 to perform a division of the tooth count signal TCT by the interval T. The EIT pulse 82 is further used to reset the interval counter 26 and produce the conversion finish signal CON FIN. The conversion finish signal indicates to the engine control that a correct RPM measurement signal is now ready to be read from the output of divider 24.

It is evident that the measurement process described yields the number of strobe pulses per the number of vernier clock pulses that are counted for the total interval T. If it is desired to change this digital representation into a radial speed, i.e., revolutions per minute, then it is necessary to know the period of the vernier clock and the angle represented by the time between two strobe pulses. The conversion calculation can be accomplished by providing the divider 24 with proper scaling for the inputs or can be later provided by a short conversion routine in the microprocessor of the engine control. Alternatively, the engine control can be programmed to directly use the digital count without conversion. If there are no tooth counts received when the maximum interval is counted as sensed by the overflow signal MIT of counter 48, then the EIT pulse of that last interval IT(N) that caused the overflow is passed through AND gate 46. This end of interval pulse EIT causes a conversion finish signal to be generated along with having the divider 24 output a digital number equivalent to zero for the speed measurement. Since the tooth count in this case would be zero for any number in the interval counter 26, the divider will produce a zero RPM output from the division.

Figure 4:
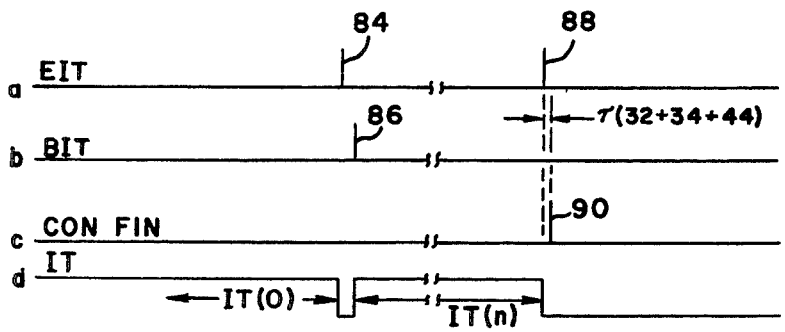
FIG. 4 is a series of waveform diagrams (a-d) illustrative of signals producing a conversion finish signal for the system illustrated in FIG. 1.

FIGS. 4a–d more clearly indicate the relationship between the iteration signal IT and the end and beginning of interval pulses EIT, BIT in an expanded time frame. It is seen in FIG. 4a that upon the occurrence of an EIT pulse 84, which occurs at the falling edge of the interval signal IT (0,1, ... ,n), the engine control waits a very short period of time (slightly longer than the sum of the delays 32, 34, and 44) and checks for a conversion finish signal CON FIN. If this signal is not received within the set period of tine, the engine control assumes that the conversion is not finished because another iteration is needed and therefore provides a rising edge to the iteration signal IT. This produces, coincident to that rising edge, a beginning interval pulse BIT 86. However, at the end of any particular interval IT(n) the falling edge of the interval signal IT produces another EIT pulse 88. The engine control again waits for the conversion finish signal CON FIN and when it appears at 90 within the required time frame, the engine control holds the IT signal low thereafter knowing that the measurement has been accomplished.

Figure 5:
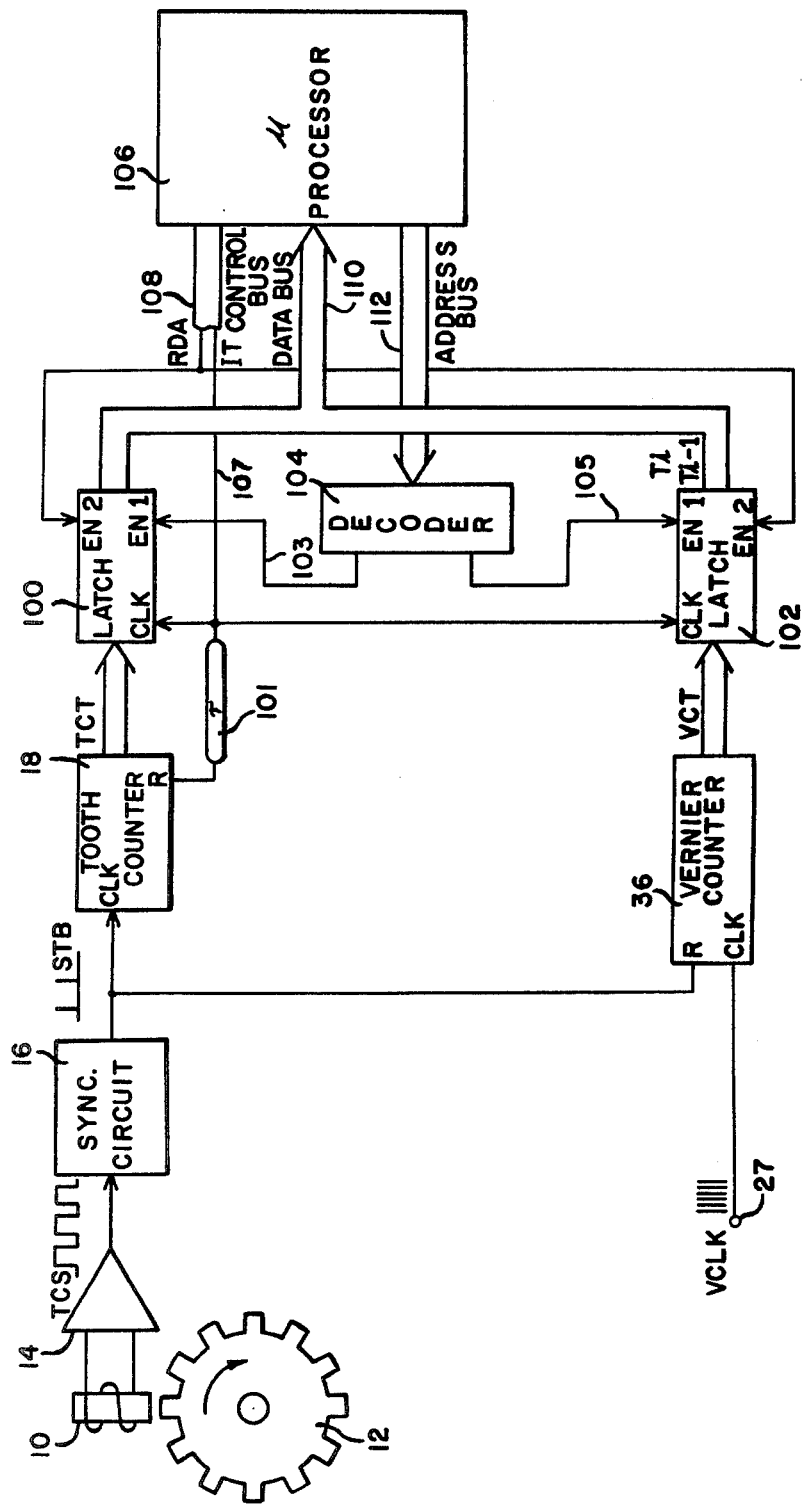
FIG. 5 is a system block diagram of a second embodiment of the system where the vernier and tooth counts are received by a miroprocessor.

With respect now to FIG. 5 there is shown another embodiment of the invention where a microprocessor 106 is used for providing the speed measurement by means of a stored program. In this particular implementation a strobe pulse signal STB is generated in the same manner as in FIG. 1 from a magnetic pickup 10, timing member 12, signal conditioning circuit 14, and synch circuit 16. This produces a strobe pulse for every passage of a tooth of the engine-driven wheel 12 past the magnetic pickup 10. As was previously described, a strobe pulse STB occurs on the falling edge of every square wave of the signal TCS.

The tooth count TCT and vernier count VCT are developed from the strobe pulses by the same method disclosed previously. The strobe pulses STB are counted in the tooth counter 18 whose output is the count TCT and the strobe pulses reset the vernier counter 36 which is counting high speed clock pulses from the vernier clock VCLK via terminal 27. The vernier counter 36, whose output is the count VCT, records the time between strobe pulses STB in increments of the vernier clock. A latch 100 is used to store the tooth count TCT when a pulse is applied to its clock input CLK and a latch 102 is used to store the vernier count VCT when a pulse is applied to its clock input CLK.

The output of each latch is connected to a data buss 110 of the microprocessor 106. The latches 100, 102 transfer data thereon in response to a read data signal, RDA, applied to their enable inputs, EN2, if their respective enable inputs, EN1, are additionally selected. The enable inputs, EN1, of latches 100, 102 are selected either by signal line 103 or signal line 105 of a decoder 104 generating a logical one level in response to the microprocessor 106 providing an address on address buss 112. The address provided by the microprocessor is the memory location of the processor assigned to the latches 100, 102. The address is decoded by a decoder 104 to select the particular latch chosen by the processor 106 and the common read data signal RDA energized to transfer the data. In this manner data can be read by the microprocessor from the latches in much the same way as from any other location in its internal memory.

System timing for this implementation is derived from an accurate timing source internal to the microprocessor 106. The source can be a pulse generator or internal clock which generates an interrupt pulse IT on signal line 107 at the beginning of every iteration interval. This implementation thereby provides for the updating of the speed measurement upon the start of each interval. The interval may be used as the major timing and computational cycle of the engine processor. The speed measurement would then occur at the beginning of every cycle and be as current as possible. In a preferred embodiment, the IT signal would be generated, for example, every 200 Msec to update the speed measurement. The IT pulse is transmitted from processor 106 over control buss 108 via signal line 107 to reset the tooth counter TCT, after delay 101, to latch the tooth count TCT into latch 100, and to latch the vernier count VCT into latch 102 at the beginning of every iteration interval.

Figure 6:
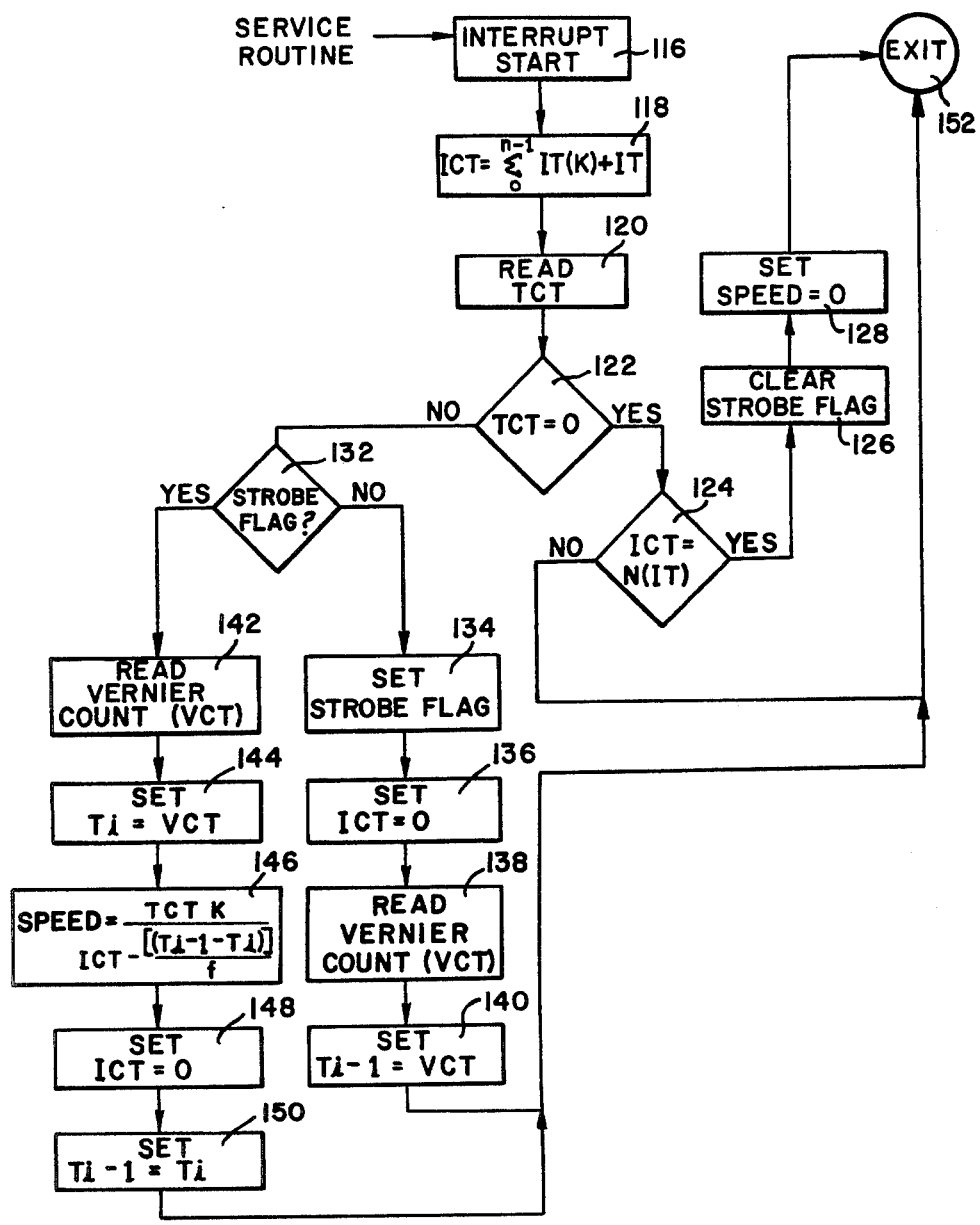
FIG. 6 is a system flow chart of an interrupt service routine for determining the measurement of speed from the vernier and tooth counts of the system illustrated in FIG. 5.

The interval signal IT occurring at the predetermined update rate of the speed measurement or the iteration rate is illustrated in FIG. 2j. The operation of this implementation will now be more fully explained with respect to FIG. 2g-j, FIG. 5, and FIG. 6. FIG. 6 is a system flow chart of a service routine programmed in the processor 106 for calculating the speed of the measured element in conjunction with the circuitry just described. When the microprocessor comes to a point in its engine control program when the IT signal is generated, it will set an internal interrupt flag which transfers control from the main program to the service routine illustrated in FIG. 6 by conventional interrupt control. The interrupt flag is cleared before program control is transferred and the service routine is entered every period in this manner to update the speed measurement. To better understand the service routine in FIG. 6 reference is further directed to FIGS. 2g-j which will be used as an explanation for the technique.

The service routine for calculating the speed measurement is entered through the block 116 where the program steps to block 118. In block 118 an interval count ICT is maintained which is whatever time has accumulated thus far (n−1)IT plus one more iteration interval IT. The flow of the program is then directed to block 120 where the contents of the tooth counter, TCT are read.

Assume this period in time is the period previous to the IT pulse 92 in FIG. 2j. When the prior IT pulse was transmitted to the latch 100 it stored the tooth count TCT for the time period prveious to that pulse. Assume for the moment that the count stored for TCT was zero. The microprocessor reads this zero count by applying the address of the latch 100 to the address buss 112, thereby enabling input EN1. The input EN2 of the latch 100 is then enabled by the RDA signal to transmit the count on the data buss 110. The count is received and stored by the microprocessor which subsequently tests to determine whether it is equivalent to zero in block 122.

Finding that the tooth count TCT is zero, the program transfers control to block 124. A zero tooth count indicates that no measurement can be made at this stage of the program. Either this is the first measurement or the microprocessor is waiting for another strobe pulse to occur and thus must add an additional iteration interval onto the measurement time. The service routine should, therefore, return control to the major program. Before control is returned through the exit at block 152, however, the accumulated time or interval count ICT must be tested to see if it is greater than the maximum or N times the iteration interval IT. If it is not, then the program exits at block 152.

If it is, meaning the loop containing blocks 116-124, and 152 has been executed N times without a strobe pulse, then the program flows through blocks 126, and 128, before exiting. These blocks indicate that the measured speed should be indicated as zero since the frequency of the strobe pulses is below the arbitrary cutoff period N(IT). Block 126 clears the strobe flag which was assumed set for the first strobe pulse 68 measured and block 128 sets the speed measurement signal to zero.

Assume, however, that a measurement can be made. At the next IT pulse 92, the program reenters the service routine through blocks 116, 118, and 120. Returning now to block 122, after the tooth count TCT is read, the test indicates the tooth count is not zero and the other path to block 132 is taken where a test is made to determine if an initial strobe flag has been set. The strobe flag set is an indication in real time that the pulse 68 in FIG. 2h has occurred and the second pulse is being awaited. If no strobe flag is set and the tooth count is not zero, this is an indication that the initial strobe flag should be set in block 134 indicating the beginning of iteration interval IT(0) at pulse 92. Block 136 thereafter sets the accumulated time period ICT to zero and a speed measurement begins.

Since these conditions indicate a previous strobe pulse 68 has occurred and a measurement is to be taken, (beginning of period IT(0)), the vernier count VCT is now read in block 138 from latch 102. The latch 102 is read in a manner similar to that described for latch 100 by addressing the latch and enabling the read data signal RDA. At this point the program is at the beginning of a measurement interval and the Vernier count VCT is representative of the accumulated time from the last strobe pulse 68. Therefore, in block 140 the previous time interval (Ti−1) is set equal to the vernier count VCT. The program exits through block 152 after this is accomplished.

At the beginning of the next and successive iteration intervals IT(0,1, . . . ,n) the service routine is once again entered through block 116 and the time period updated in block 118 and the tooth count TCT read in block 120. If the tooth count TCT is zero at the end of the present interval that part of the program branching from block 124 is entered as was previously described. However, if the tooth count TCT is no longer zero, the transfer of program control is to block 132 where the test for the strobe flag is now answered affirmatively.

This is an indication that a number of iteration intervals have passed and the second strobe pulse 70 has occurred. In this path the next step during block 142 is to read the count of the vernier counter from latch 102. At this point the program has determined that the tooth counter 102 has counted at least one more strobe pulse and therefore, since it is the beginning of an iteration interval, the speed calculation can now take place. The vernier counter contains the accumulated incremental count from the last strobe pulse 70 until the beginning of the present iteration interval at pulse 98 and is thus equal to the subsequent time interval (Ti). This equalization is accomplished in block 144.

The speed can now be calculated by dividing the tooth count TCT (one) by the total time interval T which is the accumulated interval count ICT, plus the previous time interval (Ti−1), and minus the subsequent interval (Ti). This calculation is accomplished in block 146. In this block a radial frequency may be computed by changing the vernier count to a time period. This is accomplished by dividing the vernier count by the frequency f of the vernier clock. The radial speed can then be calculated by multiplying the resulting division of the tooth count by the time interval by a constant K. The constant K relates the tooth count to the angular measure between teeth.

Program control is transferred to block 148 where the time period ICT is initialized by setting it to equal the zero. Thereafter, block 150 initializes the previous and subsequent time periods (Ti−1), (Ti) by setting them equal to each other and then the program exits through block 152. By equalizing the previous and subsequent time periods as the last step of the program, another speed measurement may be made at the next IT pulse. This is advantageous because the subsequent time period of one interval is the prior time period of the next interval.

While the preferred embodiments of the invention have been shown and described it will be obvious to those skilled in the art that various modifications and variations may be made thereto without departing from the spirit and scope of the invention as hereinafter defined in the appended claims.

We claim:

1. A method of measuring the speed of a rotating element over an extended range, the method comprising the steps of:
    (a) generating a strobe signal as a series of pulses whose frequency is proportional to the speed of the element to be measured;
    (b) generating a vernier clock signal as a series of pulses whose frequency is much higher than the frequency of said strobe signal;
    (c) generating an initial iteration interval IT(0) as a predetermined period of time asynchronously to the strobe signal;
    (d) counting the number of vernier clock pulses between the start of the initial iteration interval and the last previous strobe pulse to form a previous time interval;
    (e) counting the number of vernier clock pulses between the start of the initial iteration interval and its end to form an interval count;
    (f) counting the number of strobe pulses occurring within the initial iteration interval to form a tooth count;
    (g) generating an additional iteration interval equal to the first if no strobe pulses have been counted in either said initial interval or any of such additional intervals, otherwise skipping steps h–j;
    (h) counting the number of strobe pulses occurring within said additional iteration interval and adding them to said tooth count;
    (i) counting the number of vernier clock pulses occurring within said additional iteration interval and adding them to said interval count;
    (j) repeating step g;
    (k) counting the number of vernier clock pulses between the end of the last iteration interval and the last previous strobe pulse to form a subsequent interval;
    (l) forming a total time interval by adding said previous interval to said internal count and subtracting said subsequent interval from said interval count; and
    (m) dividing said tooth count by said total time interval to generate an RPM signal proportional to the speed of the measured element.

2. The method of measuring the speed of a rotating element as defined in claim 1 wherein said step of repeating step g includes:
    repeating step g up to a maximum of N times, where N is a predetermined integer, and then continuing the next step.

3. The method of measuring the speed of a rotating element as defined in claim 2 wherein said step of repeating step g further includes:
    varying the integer N as a function of at least one of the operating parameters of the measured element.

4. The method of measuring the speed of a rotating element as defined in claim 3 wherein the step of varying the integer N further includes:
    varying the integer N as a function of the lowest useful speed that is desired to be measured for the element.

5. The method of measuring the speed of a rotating element as defined in claim 4 wherein the step of varying the integer N further includes:
    varying the integer N as a function of the lowest useful speed that is desired to be measured for the element for a particular operating point.

6. The method of measuring the speed of a rotating element as defined in claim 1 wherein the step of generating the initial iteration interval includes:
    generating the predetermined period of time as a function of at least one of the operating parameters of the measured element.

7. The method of measuring the speed of a rotating element as defined in claim 6 wherein the step of generating the predetermined time period includes:
    generating the predetermined time period as a function of the highest useful speed that is desired to be measured for the element.

8. In a speed measuring system including:
    means for generating a speed pulse signal whose frequency varies according to the speed to be measured, means for producing clock pulses of a uniform high frequency, signal conditioning means receiving said speed pulse signal for producing a square wave pulse signal of the frequency of said speed pulse signal, synchronizing circuit means receiving said square wave pulse signal for generating a strobe pulse signal having a strobe pulse for every square wave pulse, a first counter for counting said strobe pulses, a second counter for counting said high frequency clock pulses which is reset upon the occurrence of each strobe pulse;
    a third counter for counting said high frequency clock pulses while enabled during a measuring interval, a first memory means for storing the count output of said second counter upon the initiating of said measurement interval, a second memory means for storing the count output of said second counter upon the termination of said measurement interval, a first subtractor for differencing the counts stored in said first and second memory means, a second subtractor for differencing the result from the first subtractor with the count of said third counter, a third memory means for storing the count output of said first counter upon termination of said measurement interval, and a divider for dividing the count stored in said third memory means by the result obtained from said second subtractor;

wherein the improvement comprises:

means for extending the measurement interval in increments of a predetermined time period until said first counter receives a strobe pulse during one of said extended increments and then terminating said measurement interval, a decoder providing an enabling signal where the contents of said first counter are nonzero;

a first gate enabled by said nonzero count signal for transmitting a beginning of interval pulse at the start of each measurement interval increment;

a second gate enabled by said nonzero count signal for transmitting an end of interval pulse at the end of each measurement interval increment; and a bistable device which has its output set by the output of said first gate and reset by the output of said second gate, the output of said bistable device enabling said second counter.

9. A speed measurement system as defined in claim 8 which further includes:

a fourth counter which counts the beginning of interval pulses and overflows to generate a maximum interval signal when its count reaches N a predetermined integer, and a third gate enabled by said maximum interval signal to transmit said end of interval pulse.

* * * * *